June 24, 1952 — J. LAMB — 2,601,663

SHIP'S FUNNEL WITH MEANS FOR RAISING FUNNEL GASES

Filed April 5, 1949 — 2 SHEETS—SHEET 1

Inventor: John Lamb
By Oswald H. Milmore
His Attorney

June 24, 1952 J. LAMB 2,601,663
SHIP'S FUNNEL WITH MEANS FOR RAISING FUNNEL GASES
Filed April 5, 1949 2 SHEETS—SHEET 2

Inventor: John Lamb
By Oswald H. Wilmore
His Attorney

Patented June 24, 1952

2,601,663

UNITED STATES PATENT OFFICE 2,601,663

SHIP'S FUNNEL WITH MEANS FOR RAISING FUNNEL GASES

John Lamb, London, England, assignor to Shell Development Company, San Francisco, Calif., a corporation of Delaware Application April 5, 1949, Serial No. 85,526
In Great Britain April 22, 1948

6 Claims. (Cl. 98—60)

The invention relates to improvements in ships' funnels, and is particularly concerned with an improved funnel construction for raising funnel gases emerging from a funnel to prevent or minimize such gases from being drawn down onto the deck of a ship.

In the design and building of ships the problem of counteracting the tendency of smoke, ash, and combustion gases discharged from the ship's funnel (herein collectively referred to as funnel gases) to be drawn down over the deck aft of the funnel when the ship is in forward motion, owing to the relatively low pressure produced immediately behind the funnel, has received a good deal of attention, but proposals hitherto advanced have incurred substantial, and in many cases prohibitive disadvantages. One such proposal involves increasing the height of the funnel sufficiently to prevent the funnel gases from being drawn down over the deck, but since a funnel of this height would be out of keeping with the lines of the vessel to the point of unsightliness, this solution must be regarded as impracticable. Other proposals involve the use of fans or blowers to produce a forced draft or a deflecting air stream, and yet another proposal involves washing the funnel gases, a fan or blower being used to draw the funnel gases through the washing apparatus. Expedients which require the use of fans, blowers or other impelling means having moving parts are objectionable on account of their expense in installation and operation, and the maintenance which they require.

The present invention provides a simple effective unobtrusive and inexpensive arrangement which can be applied to ship's funnels of conventional design, for lifting the funnel gases clear of the deck.

According to the invention, air from the atmosphere immediately surrounding the funnel near the top thereof is drawn in large volumes into an air intake chamber at the top of the funnel and at least partially surrounding the funnel under draft of naturally occurring atmospheric pressure; the air is then accelerated and flowed as a constricted air current forming an air sheath at least partially surrounding the current of funnel gases, for an appreciable vertical distance; and the air is then discharged as a constricted current upwardly at high velocity in the form of an air sheath surrounding at least the rear or leeward side of the ascending current of funnel gases at the point of emergence of the latter from the top of the funnel, thereby imparting a powerful upward movement to the funnel gases and effectively preventing their passage downward onto the deck of the ship. The air is warmed by passage as a constricted air sheath near to the current of funnel gases, whereby its velocity is further increased. Passage of the air into and through the air intake chamber under its own draft is achieved by drawing the air in from the forward or windward side of the funnel. Either the air intake chamber or the constricted flow channel through which the air current is discharged upwardly, or both, may surround the funnel completely, forming a complete air intake sheath and a complete air discharge sheath, respectively. In the preferred embodiment a complete air discharge sheath is employed, i. e., the upward air current encloses or boxes in the ascending current of funnel gases on all sides. An important advantage of the invention is that no fans, blowers, or other power driven machinery is required, and the air is taken in and discharged entirely by natural draft, which is the result of atmospheric pressure due to wind or the forward movement of the vessel. This method, moreover, involves the discharge of large quantities of air upwardly, and should be distinguished from proposals utilizing fins, vanes, or other airfoils for deflecting funnel gases and atmospheric air, for example, horizontally, and from proposals suitable only for high speed vehicles with short funnels wherein atmospheric air is drawn in at a point remote from the top of the funnel and no appreciable acceleration of the air velocity is effected.

For effecting the above-mentioned air flow the funnel is equipped at least near the top thereof with a double walled sheath providing between said walls an air intake chamber external to the funnel and closed at its lower end, the outer wall of the chamber having one or more air intake ports opening to the outside atmosphere at the forward or windward side, and the chamber communicating with a restricted air discharge channel formed by a second, upright double walled sheath extending upwards through an appreciable vertical distance at least to the upper edge of the funnel, said channel being open at its upper end to the outside atmosphere near to the funnel and disposed at least around the rear or leeward half thereof and having a cross-sectional area substantially less than that of the air intake chamber. It will be understood that the inner wall of either or both of said wall sheaths may be identical with the funnel wall, although in the usual and preferred installation both walls are separate from the funnel. Moreover, it is preferred that the sheaths surround the funnel completely, forming an annular air intake chamber, and an annular air discharge channel, both the chamber and channel extending completely around the funnel; the thickness of the air discharge sheath is then made substantially less than that of the air intake sheath. The term "thickness" is to be understood as relating to the shortest distance between the walls of the sheath at any given point. One of the walls of the first sheath is preferably continuous with, e. g., integral, with a corresponding wall of the second sheath, thereby facilitating the flow of air.

The pressure of the air on the forward or windward side of the funnel when the ship is in forward motion or exposed to wind, respectively, causes air to enter the aforesaid air intake chamber or sheath through the air intake ports. The air moves to the rear or leeward side of the funnel through the chamber or communicating passageway and is forced upwards through the aforesaid air discharge channel or sheath, whence it emerges into the atmosphere as a well-defined, upwardly directed current disposed at least around the rear or leeward half of the funnel. Owing to the fact that the area of the air discharge channel is less than that of the air intake chamber, the air is accelerated in its upward flow through the former, and the air current is thus discharged into the atmosphere at a velocity sufficient to lift the funnel gases, thereby tending to prevent them from being drawn into the low-pressure region behind or to the leeward of the funnel.

While it is not necessary, for the purpose of lifting the funnel gases at the rear of the funnel, that the current of ascending air be discharged on all sides of the current of funnel gases, it is preferred to employ an annular air current by providing the funnel with an air discharge sheath surrounding the whole of the funnel since an upward movement of air surrounding the whole of the emerging funnel gases has been found to be more effective than one which is disposed around a part only of the gases. Such an arrangement, further, prevents funnel gases from being wafted or drawn downward onto the deck in the event of a following wind or a crosswind.

It is customary in ships to surround the funnel proper with an outer casing, and it is to be understood that the term "funnel" as used herein means the funnel proper through which the combustion gases from the furnace are exhausted, and are not the said outer casing. Where such an outer casing is provided, the aforesaid air intake and air discharge sheaths may advantageously be inserted in the space between the funnel and the outer casing. In this embodiment of the invention the outer wall of one or both of the said sheaths may be constituted by the wall of the said outer casing.

Where the aforesaid sheaths are located in close proximity to the funnel, or where they are located in the space between the funnel and an outer casing, the temperature of the air as it passes through the air intake sheath is raised and this increases the velocity at which the upward current emerges from the air discharge sheath, thus enhancing the lifting effect.

The invention will be further described by reference to the accompanying drawings forming a part of this specification and illustrating two preferred embodiments thereof, wherein.

Figure 2:
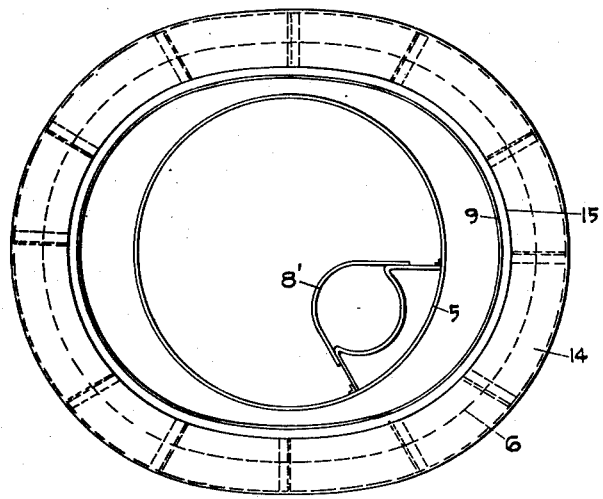
Fig. 2 is a plan view of the funnel.

Referring to Figs. 1–3, 5 represents a cylindrical funnel of circular cross-section, surrounded by the usual cylindrical outer casing 6 of elliptical cross-sectional shape, and provided with internal structural braces 7. A smaller auxiliary stack 8, for example for discharging galley smoke, may be mounted within the main funnel 5. As shown in Fig. 2 there may be a bracket 8' near the top for steadying the auxiliary stack. The annular space between the funnel and casing may serve as a vent for discharging air from the stokehold.

An elliptical, upright steel wall 9 at the top of the funnel and mounted between the funnel and the casing extends to a height slightly above the top of the funnel 5. It is provided with vertical and radial guide plates 10, which may have flanges at the top, bottom and one vertical side for stiffening, and are secured to the elliptical wall 9 only, e. g., by welding. An annular plate or ring 11 is welded both to the bottom of the wall 9 and to the casing 6. The air intake chamber, here illustrated as a complete annulus, is formed by an air intake sheath which comprises the casing 6 and wall 9 above the ring 11. One or more, e. g., six air intake ports 12, preferably in the form of vertical slots, are provided in the forward part of the casing 6 forming the outer wall of the air intake sheath and above the ring 11.

The casing 6 has an upwardly and outwardly inclined closing ring 13 at the top, affording support to an annular, inclined roof or cover 14. The latter is connected to an elliptical, upright steel wall 15 closely spaced from the wall 9 and extending upwardly to the height of the top of the wall 9. An annular and, preferably, inclined or frusto-conical wall or ring 17 may be welded to the bottom of the wall 15 to close the radially outer portion of the air intake sheath, although this ring 17 is optional and may be omitted, it being noted that the space above the air intake sheath and outside of the wall 15 is closed by the roof 14 and closing ring 13. The walls 9 and 15 constitute the air discharge sheath and the space between these walls is the air discharge channel. It should be noted that the air discharge sheath is not merely a discharge opening, but extends upwardly through an appreciable distance.

It is evident that when the vessel is in forward motion atmospheric air in front of the casing 6 causes air to enter the air intake sheath through the ports 12. This air moves to the rear of the air intake sheath and is forced upwards into the air discharge sheath, wherein its velocity is increased and whence it emerges upwardly as an air current surrounding and spaced from the funnel gases emerging from the funnel 5. Acceleration of the air current is primarily due to the fact that the thickness of the air discharge sheath is substantially less, e. g., one-third of, the thickness of the air intake sheath. Warming of the air from the funnel gases plays some part in accelerating the air. This accelerated air current lifts funnel gases and prevents or minimizes the downflow of funnel gases onto the deck behind the funnel. The additional air from the stokehold or other compartment within the ship which rises between the funnel 5 and the casing 6 escapes at the top between the funnel 5 and the wall 9 and provides an additional upward stream of air, the velocity of which is determined largely by its temperature and assists usually only slightly in lifting the funnel gases; this additional stream of air may be dispensed with.

In order to provide for the case in which the ship is moving astern, or in which the ship is moving forwardly but at a lower velocity than a following wind, the outer wall of the air intake sheath may be provided with air intake ports at its rear side as well as at its forward side, valves or sealing members being provided for both sets of ports in order to close whichever is, for the time being, toward the leeward side and not needed for admitting air. Likewise, ports and valves may be provided round the whole periphery of the outer wall of the sheath to provide for a strong wind in any direction. It will be understood that where ports are provided elsewhere than at the forward side of the funnel, for the arrangement to be generally effective in all cases, the air discharge sheath should surround the funnel.

Figure 1:
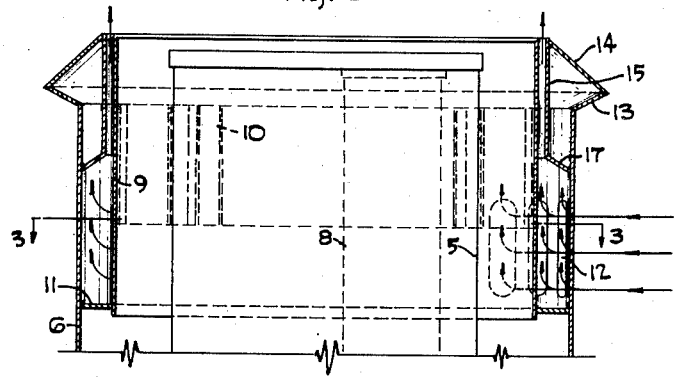
Fig. 1 is a vertical sectional view of a funnel equipped with the walled structures according to the invention.
Figure 3:
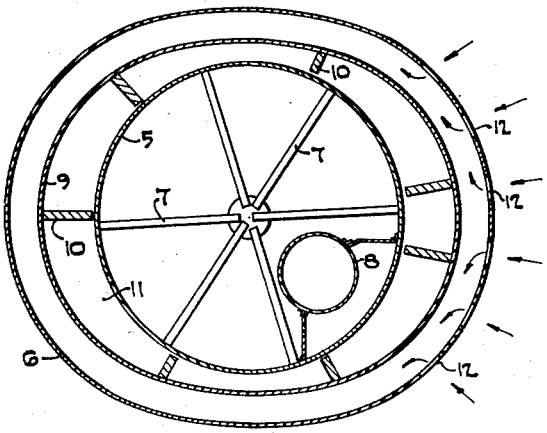
Fig. 3 is a horizontal sectional view, taken on line 3—3 of Fig. 1.
Figure 4:
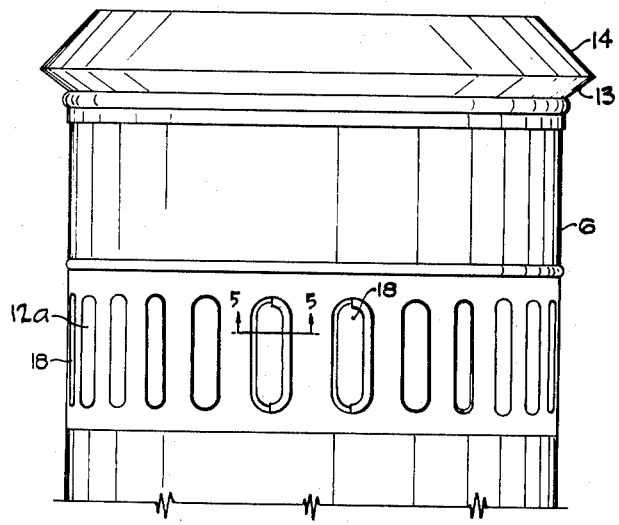
Fig. 4 is a side elevation view of a modified construction.
Figure 5:
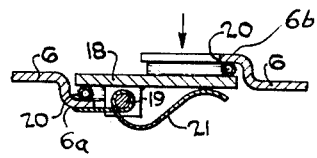
Fig. 5 is a detail sectional view taken on line 5—5 of Fig. 4.

Such a construction is shown in Figs. 4 and 5, wherein the internal structure is like that previously described for Figs. 1–3 but the air discharge sheath is slightly longer, affording a longer zone for warming the air. The outer casing 6 is provided with air intake ports 12a round the whole periphery, each port having a shutter 18 for individual operation. It is thereby possible to open the shutters to windward in any direction.

The shutters 18 may be actuated as desired. It is possible to operate them automatically by arranging them as pressure-responsive shutters. Thus, each shutter may be pivotally mounted for rotation about a separate vertical shaft 19 secured to casing 6 and disposed somewhat to one side of the center of the shutter, whereby the shutter tends to swing to the closed position shown whenever the pressure on the inside of the casing is greater than that on the outside, and vice versa. Tubular rubber sealing cushions 20 may be fixed to off-set portions 6a and 6b of the casing to insure closing despite a loose fit in the pivotal mounting, and a weak leaf spring 21, mounted on the inner face of the shutter, yieldably urges it to the closed position. The shutters will be closed when the pressures on the inside and outside are approximately equal, but will open when, due to wind or the movement of the ship, the outside atmospheric pressure exceeds that in the intake chamber.

The relative thicknesses of the air intake and air discharge sheaths must be such as to insure adequate lifting of the funnel gases in normal steaming conditions. The required ratio of thickness may, for example, be of the order of 3:1. In an actual ship with a funnel 5 of 11 feet in diameter and an elliptical outer casing 6 having major and minor diameters of 16 feet 6 inches and 14 feet 6 inches, respectively, the following arrangement has, for example, been found effective: The inner wall 9 of both the air intake and air discharge sheaths is formed by an elliptical plate having major and minor diameters of 15 feet and 13 feet, respectively, and extending from the funnel top to a depth of 9 feet. The outer wall of the air intake sheath is constituted by the outer casing wall 6, and the outer wall 15 of the air discharge sheath is an elliptical plate having major and minor diameters of 15 feet 6 inches and 13 feet 6 inches, respectively, extending from the funnel top to a depth of 2 feet. The thickness of the air intake sheath is thus 9 inches and that of the air discharge sheath is 3 inches. The casing wall has six air intake ports 12, each 1 foot wide and 4 feet 6 inches in height.

I claim as my invention:

1. In combination with an upright ship's funnel, first wall means comprising inner and outer upright walls separate from and spaced from said funnel defining a confined air intake chamber external to said funnel and near an upper part thereof; one or more air intake ports in said wall means opening to the outside atmosphere at least on the forward side of said funnel; second wall means defining an air discharge channel of constricted transverse width extending vertically along said funnel for an appreciable height at least partially surrounding said funnel, said discharge channel having a horizontal cross-sectional area substantially less than that of the air intake chamber and being located substantially at the top of the funnel, open at the top to the outside atmosphere at least on the rear side of said funnel substantially at the height of the top thereof and in communication with said air intake chamber.

2. The combinaton according to claim 1 wherein the air intake chamber is beneath the air discharge channel and is closed at the bottom.

3. The combination according to claim 1 wherein the first wall means surrounds the funnel and defines an air intake chamber in the shape of an annulus completely surrounding the funnel.

4. The combination according to claim 1 wherein the second wall means surrounds the funnel and defines an air outlet channel in the shape of an annulus completely surrounding the funnel.

5. In combination with an upright ship's funnel, an outer casing of greater diameter extending substantially to the level of the top of the funnel to provide an annular space therebetween; a first annular wall in said space extending downwardly from said level and defining an air intake chamber between said annular wall and said casing; means closing the bottom of said air intake chamber; a second wall between said first wall and the outer casing extending downwardly from said level at least at the rear side of the funnel and defining an air discharge channel between said walls, said air discharge channel being in free communication with said air intake chamber at a point below the top of the discharge channel and being in communication at the top with the outside atmosphere, the horizontal cross-sectional area of said air discharge channel being less than that of the air intake chamber; and one or more ports in said outer casing at least at the forward side thereof communicating with said air intake chamber and opening to the outside atmosphere.

6. In combination with an upright ship's funnel, an outer casing of greater diameter extending substantially to the level of the top of the funnel to provide an annular space therebetween; a first annular wall in said space extending downwardly from said level and defining an air intake chamber completely surrounding said funnel between said annular wall and said casing; means closing the bottom of said air intake chamber; a second annular wall between said first wall and the outer casing extending downwardly from said level to a lesser depth than said first wall and defining an air discharge channel between said first and second annular walls and completely surrounding said funnel, said air discharge channel being in free communication at its bottom with said air intake chamber and in communication at the top with the outside atmosphere, and the thickness of said air discharge channel being substantially less than that of the air intake chamber; and one or more air intake ports in said outer casing at least at the forward side thereof communicating with said air intake chamber and opening to the outside atmosphere.

JOHN LAMB.

REFERENCES CITED

The following references are of record in the file of this patent:

UNITED STATES PATENTS

| Number | Name | Date |
|---|---|---|
| 189,456 | Harrold et al. | Apr. 10, 1877 |
| 317,294 | Carll | May 5, 1885 |
| 629,019 | Thomas | July 18, 1899 |
| 756,057 | Rowland | Mar. 29, 1904 |
| 816,051 | Wallace | Mar. 27, 1906 |
| 1,001,166 | Riemer | Aug. 22, 1911 |
| 1,475,317 | Robinson | Nov. 27, 1923 |
| 1,873,368 | Filkins | Aug. 23, 1932 |
| 2,067,144 | Madden | Jan. 5, 1937 |

FOREIGN PATENTS

| Number | Country | Date |
|---|---|---|
| 204,408 | Switzerland | July 17, 1939 |
| 821,078 | France | Aug. 17, 1937 |
| 865,324 | France | Feb. 17, 1941 |